Jan. 18, 1955   E. V. DE CARLI   2,699,664
HEAD CONSTRUCTION FOR CLOTHES WRINGERS AND THE LIKE
Filed Dec. 28, 1949   2 Sheets-Sheet 1

Inventor:
Earl V. De Carli,
by *Merrisander Berj*
His Attorney.

Jan. 18, 1955  E. V. DE CARLI  2,699,664
HEAD CONSTRUCTION FOR CLOTHES WRINGERS AND THE LIKE
Filed Dec. 28, 1949  2 Sheets-Sheet 2

Inventor:
Earl V. De Carli,
by
His Attorney.

United States Patent Office 2,699,664
Patented Jan. 18, 1955

2,699,664

HEAD CONSTRUCTION FOR CLOTHES WRINGERS AND THE LIKE

Earl V. De Carli, Ellington, Conn., assignor to General Electric Company, a corporation of New York Application December 28, 1949, Serial No. 135,511

3 Claims. (Cl. 68—269)

This invention relates to clothes wringers, and particularly to a wringer head construction having an improved roll mounting and driving means.

It is a general object of my invention to simplify the mounting and driving mechanisms for the rolls of clothes wringers. Pursuant thereto, I eliminate the wooden journal block and drive link connection between the roll shaft and drive gear previously almost universally used to take the pressure load and transmit driving torque, and instead, support the roll shaft directly within a polygonal socket in the drive gear by uniformly spaced balls seated within the roll shaft and engaging contiguous walls of the gear cavity. This mounting efficiently transmits drive torque and very adequately supports the roll; in addition, it allows the roll to have a universal movement through an angle of several degrees with no sacrifice of power transmission. The upper roll is given freedom of action in a horizontal plane through the same angular range by a bearing block which includes vertically extending side wall slots of comparatively large radius engageable with round-face ribs in the wringer head. This upper and lower roll mounting arrangement of the wringer frame pivotal with respect to the wringer head, is especially useful, for example, in the operation of the so-called "instinctive" emergency release systems currently becoming popular. Such an instinctive emergency clutch release is disclosed and claimed in my concurrently filed application Serial No. 135,512, now Patent 2,599,239, granted June 3, 1952, assigned to the General Electric Company, assignee of this application, wherein it may be noted that the wringer frame and rolls carried thereby must be pivotal with respect to the drive means in the wringer head. Also in furtherance of the above object, I have simplified the directional drive of the wringer rolls by utilizing a drive shaft extension which freely rotatably mounts pinions continually in mesh with the roll drive gear. The shaft is axially slotted to accommodate keying means shiftable longitudinally within the shaft and engageable with one or the other of the pinions to connect the same to motive power. Externally accessible means are, of course, provided to enable the operator to shift the key from neutral to a desired driving position.

Figure 1:
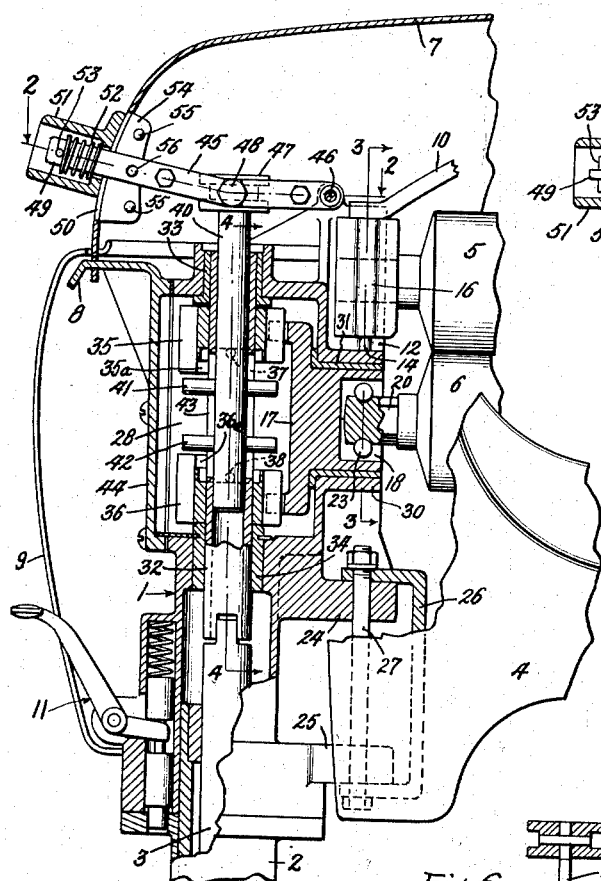
Figure 2:
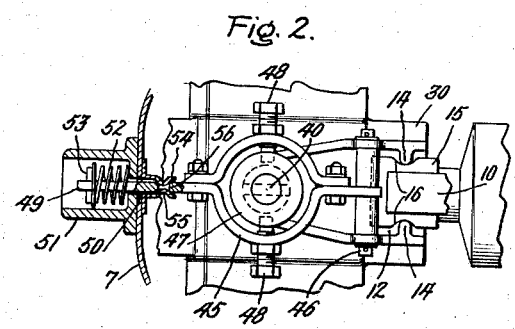
Figure 4:
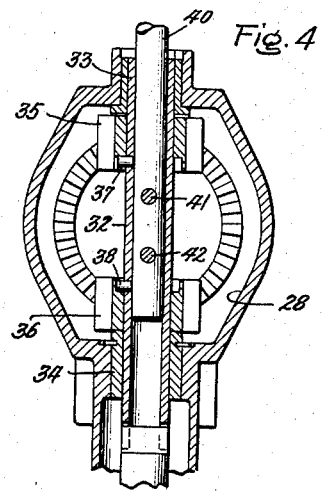
Figure 5:
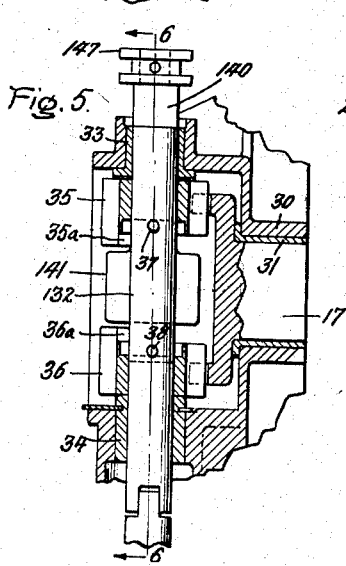
Figure 6:
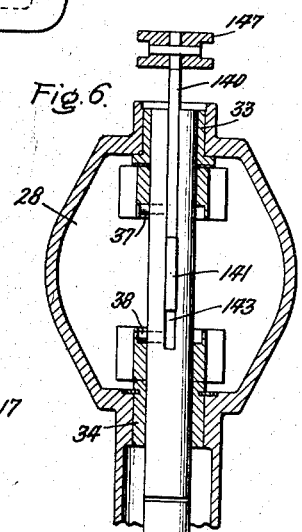
Figure 3:
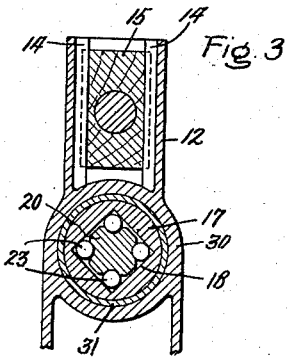
Figure 7:
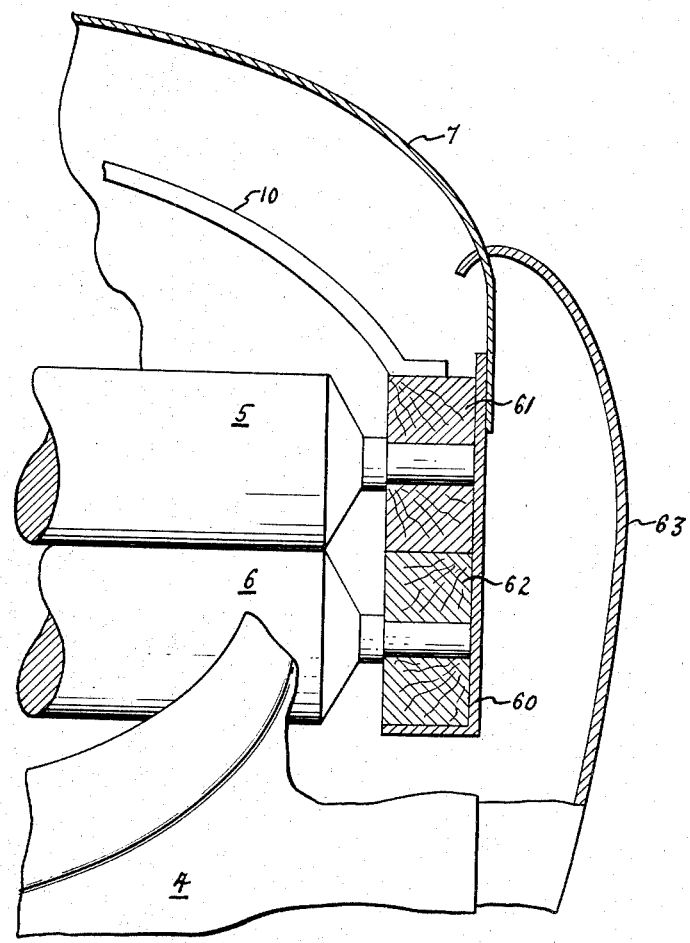

Other features and advantages of the invention will be better understood from the following detailed description thereof, taken in connection with the accompanying drawing showing presently preferred constructions. In said drawing, Fig. 1 is a side elevation, partly in vertical section, of a wringer head embodying one form of the present invention; Fig. 2 is a fragmentary plan view taken on lines 2—2 of Fig. 1; Fig. 3 is a sectional elevation of the roll mounting means taken on lines 3—3 of Fig. 1; Fig. 4 is an end elevation of one form of driving means as taken in section on lines 4—4 of Fig. 1; Fig. 5 is a side elevation, in section, of a second form of driving means; Fig. 6 is an end sectional elevation taken on lines 6—6 of Fig. 5; and Fig. 7 is a cross-sectional side elevation showing the outboard end of the wringer frame omitted from Fig. 1.

As is now well known in the art, a power driven clothes wringer includes a head 1, Fig. 1, swingably mounted on a post 2 fixed relative to a washing machine, not shown. Said head receives the upper end of a drive shaft 3 drivingly connected with a suitable motor (not shown). The fragmentarily shown frame member 4 supports at its opposite end (Fig. 7) a stile 60 journaling the outer ends of shafts of upper and lower pressure rollers 5, 6, usually in wooden bearing blocks 61 and 62 vertically slidable in said stile. Ordinarily the upper roller bearing blocks are engaged by a bow spring 10 confined within an upper frame 7 and there is provided means, not shown, to adjust the pressure of the spring against the roll blocks and thereupon to adjust the operating pressure of the rolls. Upper frame 7 may be pivotally attached to head 1 by a tongue 8 on the latter, permitting movement of the upper frame in a vertical plane. To compress spring 10 and apply roll pressure, upper frame 7 is releasably attached to the opposite end style 60. For example, a pressure applying and release mechanism may be applied as disclosed in detail by Patent No. 2,544,309 issued March 6, 1951 to S. I. Gabrielson and assigned to the General Electric Company, assignee of this application. An appropriate end mask 9 may be added to the head, as shown, while a complementary member 63 completes the enclosure at the opposite end as shown by Fig. 7. The wringer head may be indexed to various operating positions about the post and secured thereto by a latch and lever organization 11. Means are provided for reversing the direction of operation of the wringer rolls so that clothes may be inserted from either side of the wringer. Conventionally, and as hereinafter more fully described, such reversal is accomplished by suitable gear shifting means, rather than by motor reversal.

As previously stated, a feature of my invention resides in an improved mounting for the pressure rolls. The mounting for the head end of the upper roll includes providing the head 1 with a pocket 12, open at the top and front, and having side walls formed with the opposed, inwardly extending, ribs 14. As shown in Fig. 2, the faces of said ribs are rounded. The upper roll bearing block 15, which may advantageously be of wood formed to journal the shaft of roll 5, has its sidewalls formed with vertically extending arcuate grooves 16 slidably receiving the ribs 14, and of substantially larger radius than the rounded end walls of said ribs. This construction secures the block in the pocket by the engagement of the ribs with the bases of the grooves, and permits limited rotation of the block about either of the ribs. As appears more clearly in Fig. 2 the internal width of pocket 12 is larger than the maximum width of the bearing block 15 to accommodate the above-noted rotation thereof. The angular displacement may be of the order of 7° in either direction. Lower roll 6 is the drive roll, and is mounted for equivalent angular displacement without mechanical loss. Instead of using a separate bearing block as above, I journal the lower roll 6 directly within the main drive gear 17. In a preferred embodiment of my invention, I provide the hub of the gear 17 with a polygonal socket 18; the socket may advantageously be square, as shown in Fig. 3. The end of the shaft 20 of the lower roll 6 extend axially into the socket 18 in suitably spaced relation therewith, and is dimpled about its periphery to seat the balls 23, which engage with the contiguous faces of the socket 18, being tangential to the respective angularly associated pairs of socket walls.

The geometry of socket 18 and shaft 20 is critical only in the sense that the socket wall portions must engage the balls to be restrained thereby from rotation relative to the shaft and thus transmit gear torque thereto. A square socket disposes the axial lines through opposing balls in a right-angular relation. Shaft 20 may be round if desired, but the cross sectional shape shown in Fig. 3 is preferred. Dimpled sockets are preferred to grooves or channels, to simplify the maintenance of the balls in a common plane vertical to the shaft. The disposition of the balls at the corners of the square gear socket has been proven adequate to carry the pressure load imposed upon the lower roll during the passage of clothes through the wringer. There appears to be no mechanical or functional justification for a more complex arrangement—for example, using an octagonal socket with appropriate increase in the number of balls—nor for a triangular socket and a three-ball suspension.

The "instinctive" types of emergency clutch release, as is now well known in the art, include safety mechanisms which are released when the operator pushes or pulls on the wringer frame or any part thereof. I have shown no such release mechanism herein because it forms no part of the present invention, such a construction being disclosed and claimed in my above cited application, now Patent No. 2,599,239. It should be noted that my method of mounting the rolls in the wringer head, and the attachment of the frame 4 thereto permits the frame to be rotated relative to the head for the operation of an instinctive latch release. Specifically, I form the wringer head with flanges 24, 25 which are straddled by a channel 26 which may be integral with or otherwise rigidly secured to the frame 4. A pivot shaft 27 passes through the channel and the respective flanges and may conveniently have a threaded end to receive a locking nut as shown. The shaft 27 is coaxial with the respective planes of balls 23 and ribs 14, thus permitting frame rotation relative to the head. Those skilled in the wringer art will recognize the strains imposed on a wringer during its operation and engineer the frame and its cantilever mounting with due accord to the materials used therein. The journaling means for the opposite end roll shafts may be conventional.

I accommodate the transmission gearing in a relatively large wringer head cavity 28 having a collar 30 lined or otherwise provided with a bearing 31 for the hub of the main drive gear 17. Illustratively said gear is of the crown type although it is known that bevel gears are also commonly used for this purpose. The main drive shaft 3 removably couples to a tubular shaft 32 as by a jaw clutch or other convenient means, said shaft 32 preferably being journaled in upper and lower bearings 33, 34. Freely rotatably mounted on shaft 32 are the upper and lower pinions 35, 36 which are in permanent mesh with the gear 17 and held in position relative to the shaft 32 by any suitable means, for example, pins 37, 38 as more specifically shown in Fig. 4. The present invention provides simplified means for effecting the connection of a pinion to the drive shaft 32. In Fig. 1 the means comprises a rod 40 extending slidably into the shaft 32 and having pins 41, 42 projecting through axial slots 43 in said shaft. Said pins may be inserted after rod 40 has been positioned, and the housing cover plate 44 affixed after assembly.

Fig. 1 shows the clutch assembly in its neutral position in which neither of the pins is in engagement with the clutch jaws 35a, 36a, provided in the respective pinions 35, 36. The shaft 32 and its associated clutch rod 40 will rotate freely with respect to the pinions 35, 36, the latter being restrained by their engagement with the then stationary gear member 17. However, to rotate the gear 17 in forward or reverse direction the clutch rod 40 is appropriately shifted up or down to seat pin 41 or 42 as the case may be, within the jaw of a pinion. The pinion is thereupon drivingly connected to the shaft 32 and will drive the gear 17. A convenient way of accomplishing movement of the shift rod is by a yoke 45, see Figs. 1 and 2, pivotally attached to the wringer head as at 46 and embracing a collar 47 pinned to the end of the rod 40. The collar is grooved to receive the pintles at the ends of the screw members 48 carried by the yoke. Said pintles permit the collar 47 to rotate freely but nevertheless provide for lifting or depressing the shaft 40 when it is desired to shift from neutral to one or the other driving position. An extension 49 of the yoke projects through an elongate slot 50 in the top frame member 7 and fits within a shift knob 51 slidably carried on the end walls of the top frame member. Because of the fact that in some emergency release constructions the top frame member pivots vertically about its connection with the wringer head, I provide the spring 52 which bears between a pin 53 on the yoke arm 49 and the base of the shift knob cavity. The spring maintains the shift knob always in contact with the wringer head member but permits the knob to move longitudinally of the yoke arm 49 in the event of upward movement of frame member 7. Any suitable means may be employed to maintain the shift lever in a neutral position or either of its driving positions. I have illustrated a spring detent 54 having dimples 55 arranged according to the neutral, forward or reverse positions of the yoke. Said dimples will engage a hole 56 in the yoke arm 49 and thus maintain the shifted position thereof.

The shift mechanism shown in Figs. 5 and 6 utilizes a solid pinion shaft 132 having a slot 143 extending from its upper end to below the base of the clutch jaw 36a of the lower pinion. The drive key comprises a T-shaped plate 140 slidably disposed within the slot 143 and having a head 141, the outwardly extending wings of which cooperate with the jaws of the upper and lower pinions. The plate 140 is suitably guided by the upper bearing 33 and the bore of the upper pinion gear 35. A collar 147 pinned to the end of the plate is similar to and for the purpose of the collar 47 of Fig. 1.

By appropriate dimensioning of the plate 140 and the head cavity 28 the former can be "snaked" into the pinion shaft 132. If desired the upper wall of cavity 28 may be provided with means to receive a removable bearing collar 33 so that the shaft 132 with the pinions and shift plate assembled thereon may be inserted into the housing 28 through such removable top bearing wall portion.

While I have shown a particular embodiment of my invention, it will be understood, of course, that I do not wish to be limited thereto since many modifications may be made; and I therefore contemplate by the appended claims to cover any such modifications as fall within the true spirit and scope of my invention.

What I claim as new and desire to secure by Letters Patent of the United States is:

1. In a clothes wringer, a wringer head, an upper and a lower wringer roll each having shaft means projecting from the axes thereof, a wringer roll frame pivotally secured to said head and including bearing means for ends of said rolls away from said head, means for journaling the upper of said rolls including a support structure formed in said wringer head and having mutually opposed coplanar ribs normal to the axis of said roll, the opposing faces of said ribs being rounded, a journal block for said roll shaft, the side walls of said block being arcuately channeled for slidable engagement with said ribs for the support of said block thereby, the radius of said channels being larger than that of the rib faces and the sides of said block being otherwise in spaced relation with said support structure to permit of swinging said block therein, resilient means downwardly biasing said journal block, a wringer gear having a hub journaled in the wringer head in vertical alignment with said support structure and the pivotal securement of said frame to said head, and means connecting said lower wringer roll to said hub for driving the lower wringer roll.

2. In a clothes wringer, a wringer head including drive shaft means therein, a wringer roll frame pivotally secured to said head, an upper and a lower wringer roll having respective ends remote from said head journaled in said frame, a drive gear for the lower roll journaled in said head and having a hollow hub of polygonal internal configuration, a roll shaft projecting from the end of said lower roll adjacent said head and extending into said hollow hub, means engaging said roll shaft and internal surfaces of said hub forming a driving connection to said lower roll, means for journaling the adjacent end of said upper roll including a support structure formed in said wringer head and having mutually opposed coplanar ribs normal to the axis of said upper roll, the opposing faces of said ribs being rounded, a journal block for said upper roll, the side walls of said block being arcuately channeled for slidable engagement with said ribs for the support of said block thereby, the radius of said channels being larger than that of the rib faces and the sides of said block being otherwise in spaced relation with said support structure to permit swinging of said block therein, the vertical axis of the frame pivotal mounting being in alignment with the driving connection to said lower roll and the swinging axis of said block, and resilient means downwardly biasing said upper roll against said lower roll.

3. In a clothes wringer, a wringer head including drive shaft means therein, a wringer roll frame pivotally secured to said head, an upper and a lower wringer roll having respective ends remote from said head journaled in said frame, a drive gear for the lower roll journaled in said head and having a hollow hub of polygonal internal configuration, a roll shaft projecting from the end of said lower roll adjacent said head and extending into said hollow hub, ball means engaging said roll shaft and internal surfaces of said hub forming a driving connection to said lower roll permitting relative pivotal movement, means for journaling the adjacent end of said upper roll including a support structure formed in said wringer head and having mutually opposed coplanar ribs normal to the axis of said upper roll, the opposing faces of said ribs being rounded, a journal block for said upper roll, the side walls of said block being arcuately channeled for slidable engagement with said ribs for the support of said block thereby, the radius of said channels being larger than that of the rib faces and the sides of said block being otherwise in spaced relation with said support structure to permit swinging of said block therein, the vertical axis of the frame pivotal mounting being in alignment with the axis of the pivotal movement of said lower roll and the swinging axis of said block, and resilient means downwardly biasing said upper roll against said lower roll.

References Cited in the file of this patent

UNITED STATES PATENTS

| Number | Name | Date |
|---|---|---|
| 1,103,716 | Wallbillich | July 4, 1914 |
| 1,188,606 | Barker | June 27, 1916 |
| 1,565,000 | Barnes | Dec. 8, 1925 |
| 1,652,424 | Cameto | Dec. 13, 1927 |
| 1,914,452 | Netzel | June 20, 1933 |
| 2,216,397 | Kauffman | Oct. 1, 1940 |
| 2,216,398 | Kauffman | Oct. 1, 1940 |
| 2,231,651 | Altorfer | Feb. 11, 1941 |
| 2,336,233 | Dunham | Dec. 7, 1943 |
| 2,384,044 | Poorman | Sept. 4, 1945 |
| 2,446,477 | Kauffman | Aug. 3, 1948 |

FOREIGN PATENTS

| Number | Country | Date |
|---|---|---|
| 444,551 | Germany | May 23, 1927 |